Aug. 11, 1931.  J. CHRISTIE  1,817,965
MEANS FOR HOLDING FILM FLAT IN ROLL FILM CAMERAS
Filed May 31, 1930
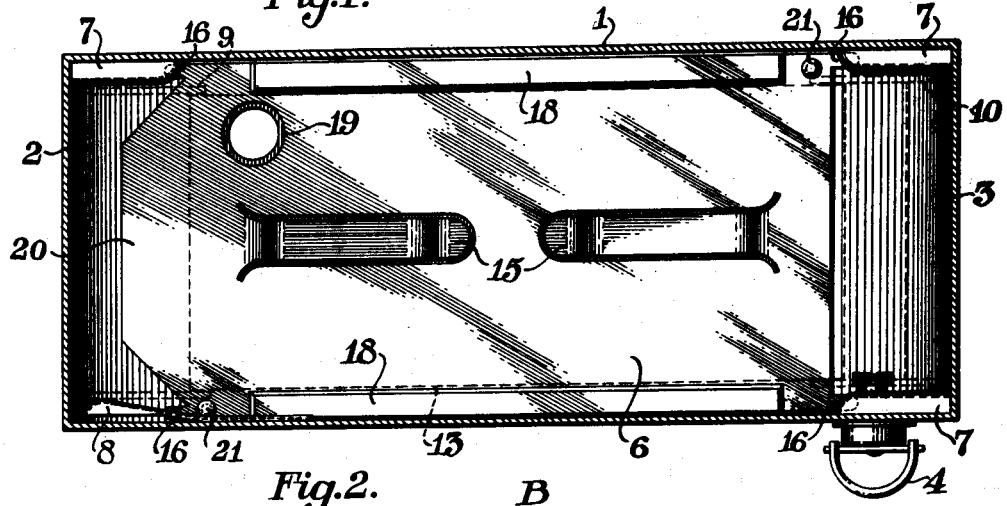
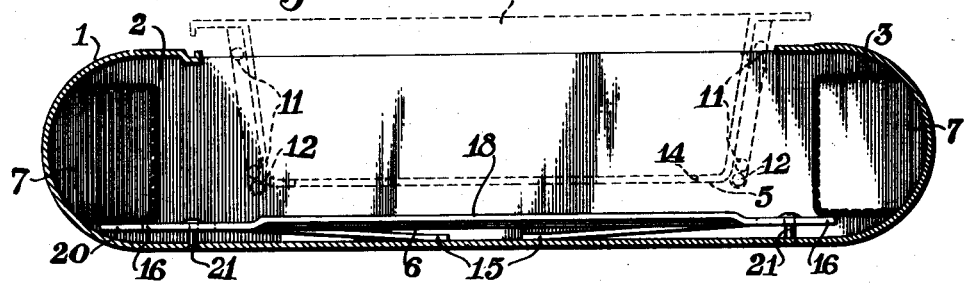
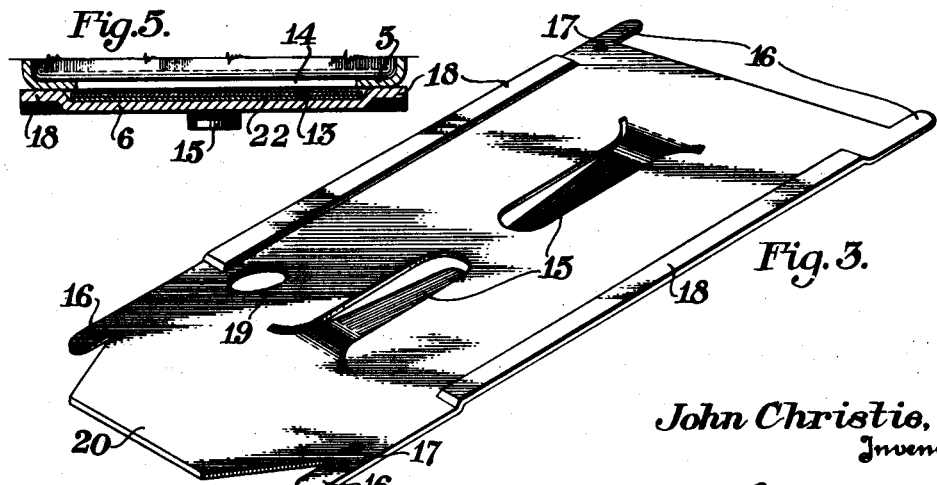
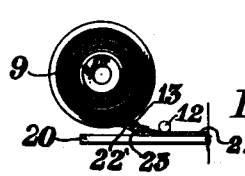
John Christie,
Inventor, Patented Aug. 11, 1931

1,817,965

UNITED STATES PATENT OFFICE

JOHN CHRISTIE, OF ROCHESTER, NEW YORK, ASSIGNOR TO EASTMAN KODAK COMPANY, OF ROCHESTER, NEW YORK, A CORPORATION OF NEW YORK

MEANS FOR HOLDING FILM FLAT IN ROLL-FILM CAMERAS

Application filed May 31, 1930. Serial No. 458,265.

My present invention relates to photography and more particularly to film pressure plates or pads, employed to hold the light sensitive film flat in the focal plane of a photographic camera.

An object of the present invention is to provide a film pressure plate which is efficient, and simple in operation and at the same time may be manufactured at a low cost.

Another object is to provide a film pressure plate which will keep the film flat in the focal plane of a camera and, at the same time, not interfere with the winding of said film.

Still another object is to provide a film pressure plate which will not interfere with the insertion or removal of the film spools.

A further object is to provide a film pressure plate having means to retain it in the proper position with relation to the camera at all times. To these and other ends the invention resides in certain improvements and combination of parts all as will be hereinafter more fully described, the novel features being pointed out in the claims at the end of the specification.

This film pressure plate is designed more particularly to be employed in photographic cameras of the type disclosed in the patent to Underwood and Reynolds No. 1,218,135, issued March 6, 1917.

In the drawings wherein like reference characters indicate like parts throughout, Fig. 1 is a cross section of a camera casing disclosing a plan view of the film pressure plate located in said casing, the film and film spools being shown in broken lines;

Fig. 2 is a cross section of a camera casing disclosing an elevation of the film pressure plate located in the casing, the camera body and exposure frame, shown in broken lines, being partially inserted in said casing;

Fig. 3 is a perspective of the film pressure plate;

Fig. 4 is an elevation of a film supply roll and one end of the film pressure plate, the near flange of said roll being removed, and Fig. 5 is a section taken across the center of the pressure plate and exposure frame.

Referring more particularly to the drawings, 1 indicates the camera casing; 2 the film supply spool chamber; 3 the film take-up spool chamber; 4 the winding key; B the camera body having an exposure frame 5 adapted to be placed intermediate the spool chambers; and 6 the film pressure plate.

In the ends of the spool chambers are located mounts for the spools such as the block 7 and the spring 8 at the supply end 2 and blocks 7 at the take-up end 3. These mounts limit the lateral movement of the film spools 9 and 10 and limit the movement of the pressure plate in an outward direction as will be pointed out later. To further locate the spools in their chambers, the camera body B is provided with support rollers 11 with which the spool flanges contact to reduce friction and prohibit the spools from longitudinal movement with respect to the camera casing. Rollers 12 are to protect the film 13 from scratching and aid it in smooth passage from one spool to the other.

The film pressure plate 6 is provided to maintain the film 13 flat in the focal plane of the camera immediately behind the exposure window 14 in the exposure frame 5. It comprises a flat metal plate having two springs 15 struck from the center thereof; four lugs 16, one in each corner; two small apertures 17, one in each of two opposite corners; two side rails 18 struck up along the edges; a small window 19 through which the exposure numbers on the film backing paper can be seen; and a tongue 20 extending from one end thereof.

The springs 15 contact with the back of the casing 1 and yieldingly press the plate 6 up against the exposure frame 5. It should be noted that these springs contact with a portion of the camera casing 1 near the center thereof, and therefore permit a slight universal movement of the plate relatively to the camera casing.

When the camera body B is removed the plate 6 is still retained in a depressed position by the corner lugs 16 which contact with the blocks 7 and the spring 8. The outward movement of the plate 6 is so limited to permit the easy removal of the film spools 9 and 10 from their respective chambers 2 and 3. If said plate 6 was allowed to spring outwardly, upon the removal of the camera body B, it would block the passage of the film spools from their chambers and cause an inexperienced operator a good deal of trouble in loading and unloading his camera.

The apertures 17 are provided to have a sliding engagement with the rivets 21 which hold the plate 6 in the proper position with relation to the casing 1. The apertures 17 are of such size that the plate may turn as well as slide upon said rivets 21 to allow the slight universal movement of said plate 6 mentioned above. When in contact with the exposure frame 5, as shown in Fig. 5, the side rails 18 form a channel for the film 13 and the backing paper 22 to pass through thereby keeping the film flat in the focal plane of the camera without actual pressure on said film 13 which would tend to scratch or mar the film through undue pressure through the film backing paper 22.

When spooling the film 13 some of the manufacturers provide a fold 23 in the backing paper 22, as shown in Fig. 4, which prevents the paper 22 from tightening and tearing or from buckling the film when being wound. This fold 23, though eliminating one difficulty, sometimes causes another by catching over the end of the pressure plate of pad in general use today, tearing or wrinkling the paper and causing difficulty in winding. Therefore I provide a lip 20 which projects from one end of my pressure plate 6 under the supply spool 9 so that the fold 23 cannot come in contact with the edge of plate and will pass on through the winding operation smoothly.

The advantages of my pressure plate can easily be seen as it is simple and efficient in construction and operation, and may be manufactured at an extremely low cost.

While I have shown the prefered embodiment of my invention in the accompanying drawings, it will be understood, of course, that such embodiment may be changed and varied by the exercise of mechanical skill and judgment without departing from the spirit of the invention as defined in the appended claims:

What I claim as new and desire to secure by Letters Patent is:

1. In a roll film camera, the combination with an exposure frame, of means for holding a film flat thereagainst including a pressure plate comprising a flat plate, springs carried by the plate adapted to press said plate against said exposure frame, raised edges on the plate adapted to limit the movement of the plate toward the frame and cooperating parts on the camera and plate for limiting the movement of the plate relative to the camera.

2. In a roll film camera, the combination with an exposure frame, of means for holding a film flat thereagainst including a pressure plate comprising a flat plate, springs carried by the plate adapted to press said plate against said exposure frame, raised edges on the plate adapted to limit the movement of the plate toward the frame and cooperating parts on the camera and plate for limiting the movement of the plate relative to the camera, comprising apertures in said plate having loose engagement with coinciding rivets secured to said camera.

3. In a roll film camera, the combination with an exposure frame, of means for holding a film flat thereagainst including a pressure plate comprising a flat plate, springs carried by the plate adapted to press said plate against said exposure frame, raised edges on the plate adapted to limit the movement of the plate toward the frame and cooperating parts on the camera and plate for limiting the movement of the plate relative to the camera comprising lugs located on said plate which contact against blocks positioned in said camera.

4. In a roll film camera, the combination with an exposure frame, of means for holding a film flat thereagainst including a pressure plate comprising a flat plate, springs carried by the raised edges on the plate adapted to limit the movement of the plate toward the frame and cooperating parts on the camera and plate for limiting the movement of the plate relative to the camera, comprising apertures in said plate having loose engagement with coinciding rivets secured to said camera, and lugs projecting from said plate which contact against blocks positioned in said camera.

5. In a roll film camera, the combination with an exposure frame, of means for holding a film flat thereagainst including a pressure plate comprising a flat plate, springs carried by the plate adapted to press said plate against said exposure frame, raised edges on the plate adapted to limit the movement of the plate toward the frame and cooperating parts on the camera and plate for limiting the movement of the plate relative to the camera, and a tongue extending from one end of said plate past the center and in back of the film supply spool carried by the camera.

6. In a roll film camera, the combination with an exposure frame, of means for holding a film flat thereagainst including a pressure plate comprising a flat plate, springs carried by the plate adapted to press said plate against said exposure frame, raised edges on the plate adapted to limit the movement of the plate toward the frame and cooperating parts on the camera and plate for limiting the movement of the plate relative to the camera, comprising apertures in said plate having loose engagement with coinciding rivets secured to said camera and lugs projecting from said plate which contact against blocks positioned in said camera, and a tongue extending from one end of said plate past the center and in back of the film supply spool carried by the camera.

7. In a roll film camera, the combination with an exposure frame, of means for holding a film flat thereagainst including a pressure plate comprising a flat plate having springs struck therefrom, and projecting toward the center thereof, adapted to press said plate against said exposure frame and simultaneously permit said plate a slight universal movement.

8. In a roll holding camera, the combination with a supply spool and a take-up spool chambers and an exposure frame intermediate said chambers, of a means for holding a film flat against said exposure frame including a pressure plate, spring pressed toward the exposure frame, having a tongue projecting from the end of said pressure plate adjacent the supply spool chamber.

9. In a roll holding camera, the combination with a supply spool and a take-up spool chambers and an exposure frame intermediate said chambers, of a means for holding a film flat against said exposure frame including a pressure plate, spring pressed toward the exposure frame, having a tongue projecting from the end of said pressure plate adjacent the supply spool chamber, said tongue extending into the spool chamber behind and past the center of a spool positioned in said spool chamber.

Signed at Rochester, New York this 29th day of May, 1930.

JOHN CHRISTIE.